US010922273B1

(12) United States Patent
Hoang et al.

(10) Patent No.: US 10,922,273 B1
(45) Date of Patent: Feb. 16, 2021

(54) FORWARD-PRIVATE DYNAMIC SEARCHABLE SYMMETRIC ENCRYPTION (DSSE) WITH EFFICIENT SEARCH

(71) Applicants: Minh Thang Hoang, Corvallis, OR (US); Muslum Ozgur Ozmen, Corvallis, OR (US); Attila Altay Yavuz, Tampa, FL (US)

(72) Inventors: Minh Thang Hoang, Corvallis, OR (US); Muslum Ozgur Ozmen, Corvallis, OR (US); Attila Altay Yavuz, Tampa, FL (US)

(73) Assignee: University of South Florida, Tampa, FL (US)

( * ) Notice: Subject to any disclaimer, the term of this patent is extended or adjusted under 35 U.S.C. 154(b) by 190 days.

(21) Appl. No.: 16/160,495

(22) Filed: Oct. 15, 2018

Related U.S. Application Data

(60) Provisional application No. 62/572,339, filed on Oct. 13, 2017.

(51) Int. Cl.
*G06F 16/14* (2019.01)
*G06F 21/62* (2013.01)
(Continued)

(52) U.S. Cl.
CPC .......... *G06F 16/148* (2019.01); *G06F 16/137* (2019.01); *G06F 16/313* (2019.01); *G06F 21/6218* (2013.01)

(58) Field of Classification Search
CPC .............................. G06F 21/60; G06F 16/148
See application file for complete search history.

(56) References Cited

U.S. PATENT DOCUMENTS 9,355,271 B2    5/2016   Yavuz et al.
2012/0078914 A1   3/2012   Roeder et al.
(Continued)

OTHER PUBLICATIONS

Stefanov et al., Practical dynamic searchable encryption with small leakage. 21st Annual Network and Distributed System Security Symposium (NDSS 2014). The Internet Society. Feb. 23-26, 2014: 1-15.

(Continued)

*Primary Examiner* — Mariela Reyes
*Assistant Examiner* — Courtney Harmon
(74) *Attorney, Agent, or Firm* — Molly L. Sauter; Smith & Hopen, P.A.

(57) ABSTRACT

A method of searching encrypted files includes a client computing device selecting a specific keyword to search a plurality of encrypted files stored at a server computing device and if the specific keyword has not been previously used to search the plurality of encrypted files, the method further includes using an encrypted keyword index stored at the server computing device to identify one or more encrypted files of the plurality of encrypted files that contain the specific keyword based upon keyword-file relationships stored in the encrypted keyword index. The method also includes, storing the keyword-file relationship for each of the one or more encrypted files that are identified as containing the specific keyword in an encrypted dictionary at the server and during a subsequent search, if the specific keyword has previously been used to search the plurality of encrypted files, the method includes using the encrypted dictionary and the encrypted keyword index stored at the server to identify one or more encrypted files of the plurality of encrypted files that contain the specific keyword based upon the keyword-file relationships for the specific keyword previously stored in the encrypted dictionary.

20 Claims, 10 Drawing Sheets

(51) Int. Cl.
*G06F 16/13* (2019.01)
*G06F 16/31* (2019.01)

(56) References Cited

U.S. PATENT DOCUMENTS

| | | | |
|---|---|---|---|
| 2013/0046974 A1 | 2/2013 | Kamara et al. | |
| 2015/0143112 A1* | 5/2015 | Yavuz | H04L 9/00 713/165 |
| 2015/0156011 A1* | 6/2015 | Kamara | G06F 21/6218 713/165 |
| 2019/0278939 A1* | 9/2019 | Fan | H04L 9/0891 |

OTHER PUBLICATIONS

Yavuz and Guajardo. Dynamic searchable symmetric encryption with minimal leakage and efficient updates on commodity hardware. LNCS: SAC 2015. 2016. vol. 9566: 241-259.

Bost. Sophos: Forward secure searchable encryption. Proceedings of the 2016 ACM SIGSAC Conference on Computer and Communications Security (CCS '16). 2016: 1143-1154.

Kamara et al., Dynamic searchable symmetric encryption. Proceedings of the 2012 ACM conference on Computer and communications security (CCS '12). 2012: 965-976.

Cao et al., Privacy-preserving multikeyword ranked search over encrypted cloud data. IEEE Transactions on Parallel and Distributed Systems. 2014. vol. 25 (No. 1): 222-233.

Wang et al., FastGeo: Efficient geometric range queries on encrypted spatial data. IEEE Transactions on Dependable and Secure Computing. 2017. vol. X (No. X): 1-1 (DOI: 10.1109/TDSC.2017.2684802).

Li et al., Toward privacy-assured and searchable cloud data storage services. IEEE Network. 2013. vol. 27 (No. 4): 56-62.

Cash et al., Dynamic searchable encryption in very-large databases: Data structures and implementation. 21th Annual Network and Distributed System Security Symposium (NDSS 2014). The Internet Society. 2014: 1-32.

Hahn and Kerschbaum. Searchable encryption with secure and efficient updates. Proceedings of the 2014 ACM Conference on Computer and Communications Security (CCS '14). 2014: 310-320.

* cited by examiner

TABLE I: Security and amortized asymptotic complexity of some state-of-the-art DSSE schemes.

| Property/Scheme | Security | | Storage | | Complexity | | Parallelizable |
|---|---|---|---|---|---|---|---|
| | Update Size Privacy | Forward Privacy | Client State | Encrypted Index | Search Cost | Update Cost | |
| $\Pi_{2\text{lev}}^{\text{dyn}}$ [1] | ✗ | ✗ | $O(1)$ | $O(N')$ | $O\left(\frac{r+d_w}{p}\right)$ | $O(m'' + r'')$ | ✓ |
| SUISE [2] | ✗ | ✗ | $O(m')$ | $O(N')$ | $O(r)$ | $O(m'')$ | ✗ |
| Stefanov et al. [3] | | ✓ | $O(N'^{\alpha})$ | $O(N')$ | $O\left(\min\left\{\frac{d_w + \log N'}{r \log^3 N'}\right\}\right)$ | $O(m'' \log^2 N')$ | ✗ |
| 2D-DSSE [4] | ✓ | ✓ | $O(m+n)$ | $O(m \cdot n)$ | $O\left(\frac{n}{p}\right)$ | $O(m)$ | ✓ |
| Sophos [5] | ✗ | ✓ | $O(m \log n)$ | $O(N')$ | $O(r + d_w)$ | $O(m'')$ | ✗ |
| FS-DSSE | ✓ | ✓ | $O(1)$ | $O(m \cdot n)$ | $O\left(\frac{r+d_w}{p}\right)$ | $O(m)$ | ✓ |

* $m$ and $n$ denote the maximum number of keywords and files, respectively. $m' \leq m$ and $n' \leq n$ denote the actual number of keywords and files, respectively. $N' \leq m'$, $n'$ is # of keyword-file pairs. $m'' = $ # of unique keywords included in an updated file, $r = $ # of files matching search query, $p = $ # of processors, $0 < \alpha < 1$, $d_w = $ # of historical update (add/delete) operations on keyword $w$, $r'' = $ (accumulated) # of unique keywords being newly added.

FIG. 1

TABLE II: Notation in FS-DSSE scheme.

| $\mathbf{I}$ | Incidence Matrix-based encrypted index |
|---|---|
| $w_i, f_j$ | Keyword and file with IDs $i$, $j$, resp. |
| $r_i$ | Row Key |
| $u_i$ | Row Counter (Initially set to 1) |
| $u_s$ | Row State (0 if row key is revealed to server, 1 otherwise) |
| $c$ | Encrypted file |
| $n, m$ | Maximum number of keywords and files in DB, resp. |
| $D[i]$ | Dictionary to store file indexes for each keyword |
| $T_w$ | Keyword hash table. |
| $\mathbf{I}[i,j].st$ | State bit indicating last access[†] on $\mathbf{I}[i,j]$ |

[†] $\mathbf{I}[i,j].st = 1$ if last access is update, and $\mathbf{I}[i,j].st = 0$ if it is search.

FIG. 2

$(\mathbf{I}, \mathcal{C}, \sigma, \mathcal{K}) \leftarrow$ FS-DSSE.Setup($1^\kappa, \mathcal{F}$): Create encrypted index 1: $k_1 \leftarrow \mathcal{E}$.Gen($1^\kappa$) and $(k_2, k_3) \xleftarrow{\$} \{0,1\}^\kappa$
2: Set $\mathcal{K} \leftarrow \{k_1, k_2, k_3\}$
3: Extract keywords $(w_1, \ldots, w_m)$ from $\mathcal{F} = \{f_{id_1}, \ldots, f_{id_n}\}$
4: Set counter $u_i = 1$, state $v_i = 1$ for each $w_i$ in hash table $T_w$
5: Set $\mathbf{I}[i, j] \leftarrow 1$ where $i$ is the keyword index in $T_w$ and $0 \leq j \leq n$ if $f_j$ contains keyword $i$
6: Generate row keys $r_i \leftarrow$ PRF($k_2 \| i \| u_i$) for $1 \leq i \leq m$
7: Encrypt each row of $\mathbf{I}$ with key $r_i$ for $1 \leq i \leq m$
8: Encrypt counters in hash table $T_w$ with $k_3$
9: Encrypt all files $\mathcal{F}$ with $k_1$ as $\mathcal{C} = \{c_j : c_j \leftarrow \mathcal{E}.\text{Enc}_{k_1}(f_j)\}$
10: return $(\mathbf{I}, \mathcal{C}, \sigma, \mathcal{K})$, where $\sigma \leftarrow T_w$ (Send $(\mathbf{I}, \mathcal{C}, \sigma)$ to server)

*FIG. 4*

$(\mathcal{R}, \sigma') \leftarrow$ FS-DSSE.Search$_\mathcal{K}(w, \mathbf{I}, \sigma)$

Client:
1: Let $i$ be index of $w$ in $T_w$
2: Download the counter $u_i$ of keyword $w_i$ in $T_w$
3: Decrypt $u_i$ with $k_3$ and generate key $r_i \leftarrow$ PRF$(k_2 \| i \| u_i)$
4: Send $(i, v'_i, r_i)$ to server

Server: On receive $(i, v'_i, r_i)$:
5: if $i$ is first-time searched then
6:    Let $\mathbf{I}'[i, *]$ be the decryption of $\mathbf{I}[i, *]$ using key $r_i$
7:    $D[i] \leftarrow \{j : \mathbf{I}'[i, j] = 1\}$
8:    Encrypt $D[i]$
9: else
10:    Decrypt $D[i]$
11:    Let $J = \{j : \mathbf{I}[i, j].st = 1\}$
12:    for each $j$ in $J$ do
13:       Let $\mathbf{I}'[i, j]$ be the decryption of $\mathbf{I}[i, j]$ using key $r_i$
14:       Add $j$ to $D[i]$ if $\mathbf{I}'[i, j] = 1$, or delete $j$ if otherwise
15: Send $\mathcal{R} = \{c_j : j \in D[i]\}$ to client
16: Re-encrypt $D[i]$, set $\mathbf{I}[i, *].st = 0$ and $T_w[i].v \leftarrow 0$
17: return $(\mathcal{R}, \sigma')$, where $\sigma' \leftarrow T_w$ with $i$-th entry being updated

Client: On receive $\mathcal{R}$
18: $f_j \leftarrow \mathcal{E}.\text{Dec}_{k_1}(c_j)$ for each $c_j \in \mathcal{R}$

*FIG. 6*

$(\mathbf{I}', \mathcal{C}', \sigma') \leftarrow \text{FS-DSSE.Update}_K(f_j, \mathbf{I}, \sigma, \mathcal{C})$

Client:
1: Set $\bar{\mathbf{I}}[*, j] \leftarrow 0$ and $c \leftarrow NULL$
2: Download all counters $u_i$ and states $v_i$ $(1 \leq i \leq m)$ in $T_w$
3: Download state column $\mathbf{I}[*, j]$.st
4: Let $V = \{i : v_i = 0\}$
5: Extract keywords $(w_1, \ldots, w_t)$ from $f_j$
6: Decrypt counters $u_i$ with $k_3$, and set $u_i \leftarrow u_i + 1$ for each $i \in V$
7: Generate keys $r_i \leftarrow \text{PRF}(k_2 \| i \| u_i)$
8: Set $\bar{\mathbf{I}}[x_i, j] \leftarrow 1$ for $1 \leq i \leq t$, where $x_i$ is index of $w_i$ in $T_w$
9: Encrypt $f_j$ as $c_j \leftarrow \mathcal{E}.\text{Enc}_{k_1}(f_j)$
10: Encrypt each row $\bar{\mathbf{I}}[i, j]$ with row keys $r_i$, for $1 \leq i \leq m$
11: Let $\vec{u} \leftarrow (u_1, \ldots, u_n)$, where each $u_i$ is encrypted with $k_3$
12: Send $(\bar{\mathbf{I}}[*, j], c_j, j, \vec{u})$ to server

Server:
13: $T_w[i].u \leftarrow u_i$ and set $T_w[i].v \leftarrow 1$ for $1 \leq i \leq m$
14: Set $\mathbf{I}[*, j] \leftarrow \bar{\mathbf{I}}[*, j]$ and $\mathbf{I}[*, j].\text{st} \leftarrow 1$
15: return $(\mathbf{I}', \mathcal{C}', \sigma')$, where $\mathbf{I}' = \mathbf{I}$ with column $j$ updated, $\mathcal{C}' = \mathcal{C}$ updated with $c_j$, $\sigma' = T_w$ with counters and states updated

FORWARD-PRIVATE DYNAMIC SEARCHABLE SYMMETRIC ENCRYPTION (DSSE) WITH EFFICIENT SEARCH

CROSS-REFERENCE TO RELATED APPLICATIONS

This application claims priority to U.S. Provisional Patent Application 62/572,339, filed Oct. 13, 2017 and entitled "Forward-Private Dynamic Searchable Symmetric Encryption with Efficient Search", which is herein incorporated by reference in its entirety.

GOVERNMENTAL SUPPORT

This invention was made with Government support under Grant No. CNS-1652389 awarded by the National Science Foundation. The Government has certain rights in the invention.

BACKGROUND OF INVENTION

Cloud computing enables massive computation and storage resources that offer a wide range of services. One of the most important cloud facilities is Storage-as-a-Service (SaaS), which allows the client to outsource data to the cloud, thereby reducing data management and data maintenance costs. Despite its merits, this service also brings severe privacy issues. Once the client outsources data to the cloud, control over data privacy is lost. Such a situation may result in the leaking of critical information to the cloud or malicious entities if the cloud is compromised (e.g., a malware). Although standard encryption techniques, such as Advanced Encryption Standard (AES) can provide data confidentiality, AES also prevents the user from searching or updating information stored on the cloud, and therefore completely invalidates the benefits of using the SaaS services.

To address the aforementioned privacy versus data utilization dilemma, Dynamic Symmetric Searchable Encryption (DSSE) techniques have been proposed, which allow the client to encrypt their own data in such a way that it can be later searched and dynamically updated. This is achieved via the creation of an encrypted index containing a set of keyword-file pairs, which associate search/update tokens with the out-sourced files encrypted with standard symmetric encryption (e.g., AES). Various DSSE schemes have been proposed in the literature, each offering various security, functionality, and efficiency trade-offs.

Recently, several studies have shown that most efficient (sublinear) DSSE schemes leak significant information and are vulnerable to statistical inference analysis. For instance, it has demonstrated that a file-injection attack strategy can recover all keywords being searched or updated in DSSE. It has also been identified that the forward-privacy is an imperative security feature for modern DSSE schemes to mitigate the impact of such attacks. Specifically, a DSSE is called forward-private if the search query does not reveal any information that can be exploited to determine the content of the files being added or deleted in the future. However, a very limited number of forward-private DSSE schemes have been proposed, all of which suffer from the efficiency and practicality concerns. This inherent deficiency in known forward-private DSSE schemes is due to the fact that the known forward-private DSSE schemes either incur polylogarithmicx/linear search overhead or rely on Public Key Cryptography (PKC) which is known to be computational costly.

Accordingly, what is needed in the art is an improved DSSE scheme that offers forward-privacy in a more efficient and practical manner.

SUMMARY OF THE INVENTION

In various embodiments the present invention provides for an improved DSSE scheme that incorporates special secure update strategies and a novel caching strategy to reduce the computation cost of repeated queries. Accordingly, the DSSE scheme of the present invention simultaneously achieves forward-privacy, sublinear search complexity, low end-to-end delay and parallelization capability.

In one embodiment, the present invention provides a method for searching encrypted files which includes selecting, with a client computing device, a specific keyword to search a plurality of encrypted files stored at a server computing device. The method further continues by determining if the specific keyword has been previously used to search the plurality of encrypted files and if the specific keyword has not been previously used to search the plurality of encrypted files, the method continues by using an encrypted keyword index stored at the server computing device to identify one or more encrypted files of the plurality of encrypted files that contain the specific keyword, wherein the encrypted keyword index comprises a plurality of cells and wherein a cell value in each of the plurality of cells represents a keyword-file relationship. The method then continues by storing the keyword-file relationship for each of the one or more encrypted files that contain the specific keyword in an encrypted dictionary at the server. Alternatively, if the specific keyword has previously been used to search the plurality of encrypted files, the method continues by using the encrypted dictionary stored at the server to identify one or more encrypted files of the plurality of encrypted files that contain the specific keyword based upon the keyword-file relationships for the specific keyword previously stored in the encrypted dictionary.

The method of the present invention further includes, achieving forward-privacy while updating one or more of the plurality of encrypted files stored at the server computing device.

In an additional embodiment, the present invention includes a system for searching encrypted files which includes a client computing device comprising a client processor and a client memory, wherein the client memory stores a plurality of components and the client processor is configured to execute the plurality of components. The system additionally includes a server computing device comprising a server processor and a server memory, wherein the server memory stores a plurality of components and the server processor is configured to execute the plurality of components. The system also includes a network device configured to send and receive data between the client computing device and the server computing device.

In various embodiments, the client processor of the client computing device is configured to select a specific keyword to search a plurality of encrypted files stored at the server computing device and if the specific keyword has not been previously used to search the plurality of encrypted files, the client processor is configured to use an encrypted keyword index stored at the server computing device to identify one or more encrypted files of the plurality of encrypted files that contain the specific keyword, wherein the encrypted keyword index comprises a plurality of cells and wherein a cell value in each of the plurality of cells represents a keyword-file relationship. The client processor is additionally configured to store the keyword-file relationship for each of the one or more encrypted files that contain the specific keyword in an encrypted dictionary at the server and in a subsequent search, if the specific keyword has previously been used to search the plurality of encrypted files, the client processor is further configured to use the encrypted dictionary stored at the server to identify one or more encrypted files of the plurality of encrypted files that contain the specific keyword based upon the keyword-file relationships for the specific keyword previously stored in the encrypted dictionary.

The present invention further provides a nontransitory computer-readable medium comprising instructions that, when executed by a client processor and a server processor, cause the client process and the server processor to perform acts comprising selecting, with a client computing device, a specific keyword to search a plurality of encrypted files stored at a server computing device and if the specific keyword has not been previously used to search the plurality of encrypted files, the acts further including using an encrypted keyword index stored at the server computing device to identify one or more encrypted files of the plurality of encrypted files that contain the specific keyword, wherein the encrypted keyword index comprises a plurality of cells and wherein a cell value in each of the plurality of cells represents a keyword-file relationship and storing the keyword-file relationship for each of the one or more encrypted files that contain the specific keyword in an encrypted dictionary at the server.

Additionally, the instructions further provide for, if the specific keyword has previously been used to search the plurality of encrypted files, using the encrypted dictionary stored at the server to identify one or more encrypted files of the plurality of encrypted files that contain the specific keyword based upon the keyword-file relationships for the specific keyword previously stored in the encrypted dictionary.

As such, in various embodiments, the present invention provides an improved DSSE scheme that offers forward-privacy in a more efficient and practical manner.

BRIEF DESCRIPTION OF THE DRAWINGS

For a fuller understanding of the invention, reference should be made to the following detailed description, taken in connection with the accompanying drawings, in which:

FIG. 1 is a table illustrating security and amortized asymptotic complexity of several state-of-the-art DSSE schemes.

FIG. 2 is a table illustrating some of the notation used in the FS-DSSE scheme, in accordance with an embodiment of the present invention.

FIG. 4 is a swim diagram illustrating the steps performed in the FS-DSSE Setup procedure, in accordance with an embodiment of the present invention.

FIG. 6 is a swim diagram illustrating the steps performed in the FS-DSSE Search procedure, in accordance with an embodiment of the present invention.

FIG. 8 is a swim diagram illustrating the steps performed in the FS-DSSE Setup procedure, in accordance with an embodiment of the present invention.

DETAILED DESCRIPTION OF THE INVENTION

Figure 3:
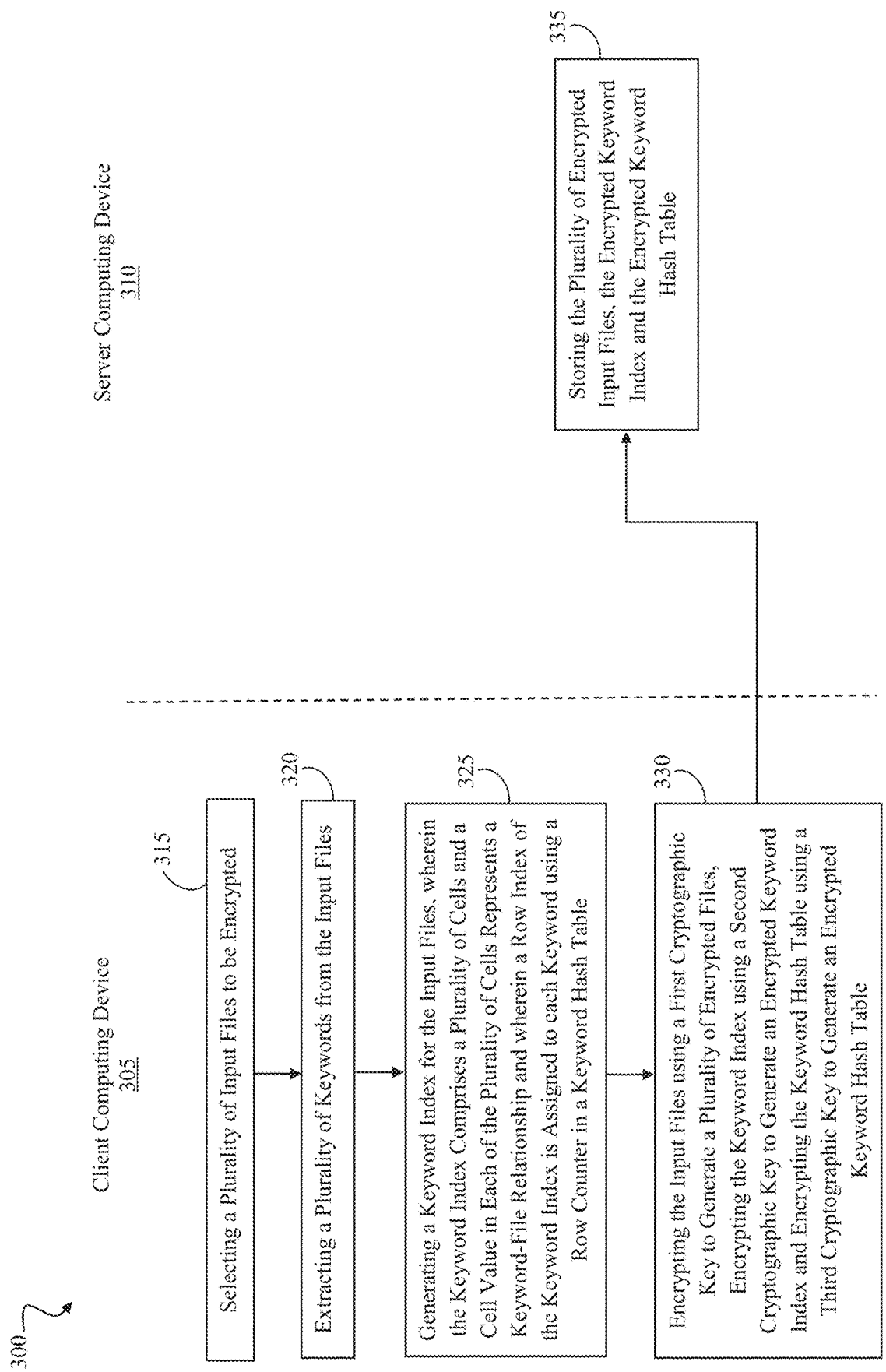
FIG. 3 is an illustration of the steps used in the FS-DSSE Setup procedure, in accordance with an embodiment of the present invention.

In the following detailed description of the preferred embodiments, reference is made to the accompanying drawings, which form a part hereof, and within which are shown by way of illustration specific embodiments by which the invention may be practiced. It is to be understood that other embodiments by which the invention may be practiced. It is to be understood that other embodiments may be utilized, and structural changes may be made without departing from the scope of the invention.

In various embodiments, the present invention provides a DSSE scheme that offers important features for practical deployment including forward-privacy, sublinear search time with parallelization support and low client storage. These goals are achieved by harnessing a secure update strategy on a special encrypted index structure, in addition to a novel caching strategy using a dictionary data structure to partially store the result of previous search queries. The novel scheme may be referred to as a Forward-Private and Sublinear DSSE (FS-DSSE) scheme, which includes the following desirable properties:

(1) High-Speed Search with Full Parallelization: The proposed scheme offers the lowest search delay among its counterparts. In the asymptotic point of view, the search complexity is (i) equivalent to the most efficient yet forward-insecure DSSE scheme, and (ii) lower than state-of-the-art forward-private DSSE schemes. The proposed scheme is also fully parallellizable, and therefore can take advantage of multi-threading techniques offered by the cloud. Experimental evaluation has shown that the search delay of the present invention is comparable to the most efficient, yet forward-insecure, DSSE scheme, while also being one to three orders of magnitude faster than its forward-private counterparts.

(2) Low Client Storage Overhead: The proposed scheme features $\mathcal{O}$ (1) client storage overhead, in which the client only needs to store a few symmetric keys. This property allows the proposed scheme to be deployed on mobile settings where the client has a limited memory capacity.

(3) High Security: The present scheme not only achieves forward-privacy as the important security feature, but also can hide the size information of some operations on the encrypted index. Specifically, the proposed scheme does not leak the number of actual keyword-file pairs in update operation and the encrypted index size. Note that such information is leaked in many state-of-the-art DSSE schemes, which might be exploited in statistical attacks.

Table I in FIG. 1 presents the overall comparison in terms of security, operation complexity and storage overhead between our scheme and some recent DSSE schemes.

Most DSSE schemes currently known in the art inevitably leak access patterns and therefore are vulnerable to statistical inference attacks which leverage the access pattern, wherein the access pattern is defined as the files that a keyword appears in. Some DSSE schemes have proposed techniques to prevent these attacks, but they are not efficient or fully secure. Although these statistical attacks can be prevented by implementing Oblivious Random Access Machine (ORAM) or Private Information Retrieval (PIR) techniques, these techniques are known to be extremely costly for practical deployment.

Denoting $\varepsilon$=(Setup, Enc, Dec) as an IND-CPA-secure (Indistinguishability under Chosen Plain Text Attack) symmetric encryption where $k \leftarrow \varepsilon.Setup(1^\kappa)$ generates a symmetric key k given a security parameter $\kappa$; $c \leftarrow \varepsilon Enc_k(M)$ returns the ciphertext c of the message M encrypted with key k; $M \varepsilon \varepsilon Dec_k(c)$ returns the plaintext M of the ciphertext c which is previously encrypted by k. A Pseudo Random Function (PRF) is a polynomial-time computable function, which is indistinguishable from a true random function by any PPT adversary. Table II in FIG. 2 summarizes some notable notations for future reference throughout the following disclosure.

In an exemplary embodiment, the system model of the present invention consists of one client and one server. The server is assumed to be honest-but-curious, meaning that it will not inject malicious inputs to compromise the protocol, but it can extract the information from the protocol transcript as much as possible. It is assumed that the client communicates with the server via a secure channel (e.g., Transport Layer Security (TLS)) in the synchronous model.

The following definitions apply to DSSE as follows:

A DSSE scheme is a tuple of one algorithm and two protocols DSSE=(Setup, Search Update), where:

(1) (I, C, $\sigma$, $\mathcal{K}$) $\leftarrow$ Setup($1^k$, $\mathcal{F}$): It takes as input a security parameter $\kappa$, a list of (plaintext) documents and returns an encrypted index I, a list of encrypted files C, a state $\sigma$, and a key $\mathcal{K}$.

(2) ($\mathcal{R}$, $\sigma'$) $\leftarrow$ Search$\mathcal{K}$ ($\omega$, I, $\sigma$): The client inputs the key C, a keyword w to be searched, the server inputs the encrypted index I and a state $\sigma$. The protocol outputs to the client the search result $\mathcal{R}$, and outputs to the server a new state $\sigma$.

(3) (I', C', $\sigma'$) $\leftarrow$ Update$\mathcal{K}$ (f, I, C, $\sigma$): The client inputs the key $\mathcal{K}$, a filed to be updated f, the server inputs the encrypted index I, the state $\sigma$ and the list of encrypted files C. The protocol outputs to the server a newly updated encrypted index I', the updated state $\sigma'$, and the updated list of encrypted files C', where f is added or deleted.

The proposed FS-DSSE of the present invention, in view of the above DSSE definitions will now be described.

In accordance with the present invention, the main observation is that, the search query in standard DSSE will reveal a part of the encrypted index to the server in order to retrieve the corresponding encrypted files. Therefore, once a keyword is searched again, it is not necessary to repeat the computation on the encrypted index to extract corresponding files that were previously revealed. Instead, one can leverage a more compact and simple data structure (e.g. dictionary) to store file IDs revealed in the first search so that if the same query is repeated, the server will simply get the results stored in this data structure. This strategy will amortize the computation cost incurred in the first search operation and therefore, will make DSSE schemes more efficient. Note that the price to pay for gaining this search efficiency is (at most) double the server storage overhead.

Another objective of the present invention is to establish a DSSE scheme such that the aforementioned strategy can be adapted efficiently. It is observed that commonly known DSSE schemes offer a high level of security, including forward-privacy, with the cost of linear search complexity. This computation cost can be significantly reduced by implementing the proposed caching strategy of the present invention. As such, the methods of the present invention can be implemented in known DSSE schemes to construct FS-DSSE incorporating the inventive caching strategy.

FS-DSSE leverages three different types of data structures, including incidence matrixes, hast tables and dictionaries.

The present invention utilizes an encrypted index that is constructed using an incidence matrix I, which represents the keyword-file relationships via its cell contents. The encrypted index stores the (encrypted) relationship between keyword indexing at row i and file indexing at column j. Given a matrix I, I[i,j] denotes the cell indexing at row i and column j. I[*,j] and I[i,j] denote accessing column j and row i of matrix I, respectively. Specifically, I[i,j]=1 if the keyword indexing at row i appears in the file indexing at column j, and I[i,j]=0 if otherwise. The search and update operations access a row and a column of I, respectively. I is then encrypted bit-by-bit with IND-CPA encryption. Each cell of I also has a bit state as I[i,j]·st to keep track of the last access operation (search/update) on it. Particularly, I[i,j]·s is set to a 1 or a 0 if I[i,j] is accessed by update or search, respectively.

Additionally, a hash table $T_\omega$ is used to determine the row indexes assigned to the keywords in I. For simplicity, it is assumed that files are indexed from 1 to n and therefore, it is not required to create a hash table for them. $T_\omega$ additionally stores a counter value for each keyword $\omega$ as $c_i \leftarrow T_\omega[i] \cdot c$, where i is the index of $\omega$ in $T_\omega$, which is incremental after each file update operation to achieve the forward-privacy. A state bit is also stored for each keyword $\omega$ in $T_\omega$ as $v_i \leftarrow T_\omega[i] \cdot v$, which indicates if the keyword has just been searched ($v_i$=0) or updated ($v_i$=1). In the FS-DSSE scheme, $T_\omega$ is stored at the server, where all counters inside $T_\omega$ are encrypted, to achieve $\mathcal{O}$ (1) client storage, in which some of its components will be retrieved during the search and update operations, as described in further detail below.

FS-DSEE leverages a caching strategy at the server to reduce the computation cost of repeated search operations. A dictionary data structure D is employed to store the search result of the queries when the keyword is first searched. D can be considered as an array of size m, wherein D[i] stores the list of file IDs which is revealed when searching the keyword indexing at row i in I. D is encrypted with IND-CPA encryption and is updated if there are filed operations performed on I in between the search queries. Additionally, an update policy is utilized to keep D always consistent, as described in further detail below.

As shown with reference to FIG. 3, to implement the setup procedure 300 in FS-DSSE, a client computing device 305 is configured for selecting a plurality of input files to be encrypted 315 and for extracting a plurality of keywords from the input files 320. The client computing device 305 is further configured for generating a keyword index for the input files, wherein the keyword index comprises a plurality of cells and a cell value in each of the plurality of cells represents a keyword-file relationship and wherein a row index of the keyword index is assigned to each keyword using a row counter in a keyword has table 325. The client computing device is further configured for encrypting the input files using a first cryptographic key to generate a plurality of encrypted files 330, encrypting the keyword index using a second cryptographic key to generate an encrypted keyword index and encrypting the keyword has table using a third cryptographic key to generate an encrypted keyword hash table 300. The client computing device then transmits the plurality of encrypted input files, the encrypted keyword index and the encrypted keyword hash table to a server computing device 310 and the server computing device stores the encrypted files 335.

FIG. 4 illustrates steps for performing the setup for FS-DSSE in additional detail. As shown with reference to FIG. 4, to implement FS-DSSE, first, the client calls FS-DSSE.Setup procedure in order to create the encrypted files $\mathcal{F}$ and encrypted index, which the client then sends to the server. The FS-DSSE.Setup procedure (i) generates three keys $\mathcal{K}$ used to encrypt the input files, the incidence matrix and the counters in the hash table, (ii) extracts keywords from the input files, each being assigned to a row index via the hash table $T_\omega$, and (iii) sets the corresponding value for each I[i,j]. Note that a counter for each keyword is also stored in $T_\omega$, which will be used to derive a key to achieve the forward-privacy during update. The client encrypts the incidence matrix I, the counters in the hash table $T_\omega$, and all the input files $\mathcal{F}$, and then sends them to the server, while keeping the keys $\mathcal{K}$ secret.

Figure 5:
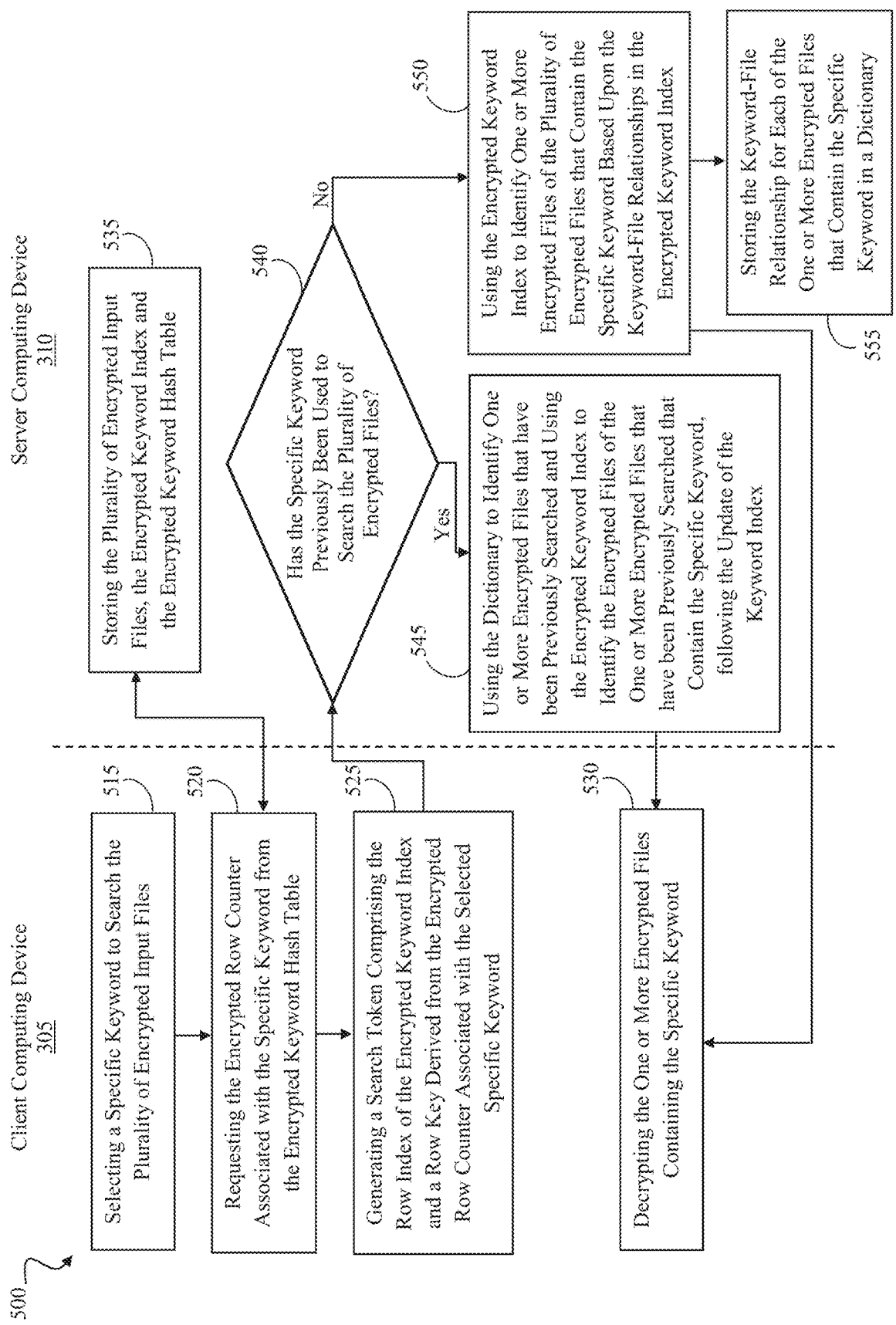
FIG. 5 is an illustration of the steps used in the FS-DSSE Search procedure, in accordance with an embodiment of the present invention.

As shown with reference to FIG. 5, to implement the search procedure 500 in FS-DSSE, the client computing device 305 is configured for selecting a specific keyword to search the plurality of encrypted files stored at the server computing device 515. The client computing device 305 then requests the encrypted row counter associated with the specific keyword from the encrypted keyword hash table 520 stored at the server computing device 310 and then generates a search token comprising the row index of the encrypted keyword index and a row key derived from the encrypted row counter associated with the selected specific keyword 525. The server computing device 310 then determines whether or not the specific keyword has previously been used to search the plurality of encrypted files 540.

If the specific keyword has not previously been used to search the encrypted files, the encrypted keyword index is used to identify one or more encrypted files that contain the specific keyword based upon the keyword-file relationship in the encrypted keyword index 550. The server computing device then stores the keyword-file relationship for each of the one or more encrypted files that contain the specific keyword in a dictionary 555.

Figure 7:
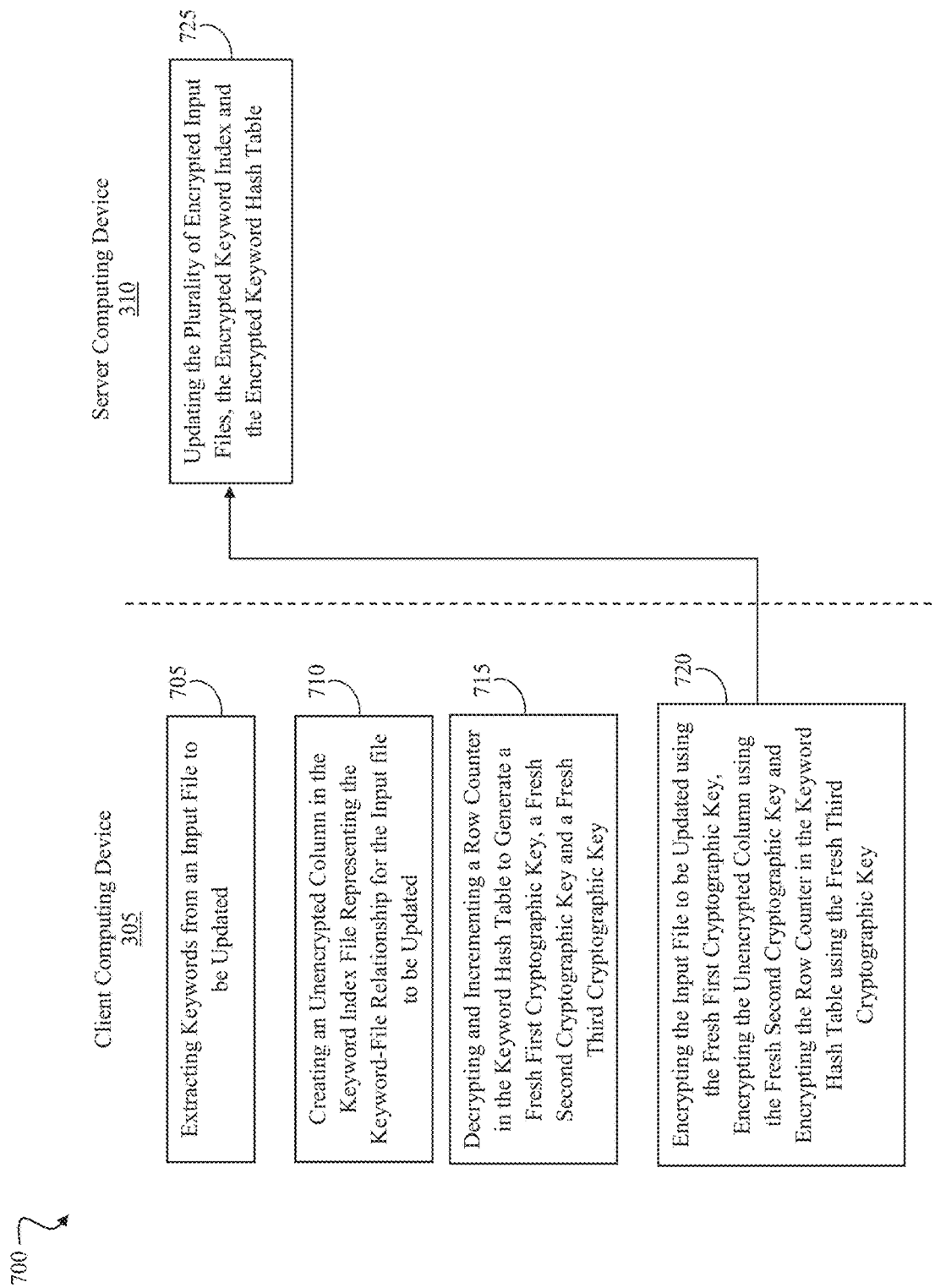
FIG. 7 is an illustration of the steps used in the FS-DSSE Update procedure, in accordance with an embodiment of the present invention.

Alternatively, if the specific keyword has previously been used to search the encrypted files, then both the dictionary and the encrypted keyword index are used to identify the one or more encrypted files that contain the specific keyword 545 by using the dictionary to identify one or more encrypted files of the plurality of encrypted files that have been previously searched and using the encrypted keyword index to identify the encrypted files of the one or more encrypted files that have been previous searched that contain the specific keyword, wherein these files have been previously updated via the update protocol, illustrated in FIG. 7 and FIG. 8, prior to this search operation.

After the one or more encrypted files containing the keyword have been identified, they are transmitted to the client computing device 305, wherein they are then decrypted by the client computing device 530.

FIG. 6 illustrates steps for performing searching in accordance with for FS-DSSE in additional detail. As shown with reference to FIG. 6, to search a keyword $\omega$, the client first requests the encrypted counter of the keyword $\omega$ stored in the keyword had table $T_\omega$. Then, the client sends a search token containing the row index i and the row key $r_i$, derived from the counter, to the server. If the keyword is first-time searched, then the server decrypts the whole row I[i,*] with $r_i$, adds all column indexes j, where I[i,j]=1, to the dictionary D[i]. As such, the server encrypts D with a self-generated key just to preserve the data privacy against outside attackers. The server then returns corresponding encrypted files matching with such indexes to the client.

If the previously-searched keyword is searched again, the server retrieves indexes of corresponding encrypted files by simply decrypting D[i]. It is important to note that D[i] might need to be updated, given that there are some file update operations on I that happened after the latest search on $\omega_i$. This is achieved by checking the state bit I[*,*]·st. Specifically, if I[*,*]·st=1, then the server decrypts I[i,j] and adds the entry j to D[i] if I[i,j]=1, or alternatively, the server deletes entry j from D[i] if I[i,j]=0.

The user of data structure D enables FS-DSSE to have an amortized sublinear search complexity. Specifically, the computation cost of the first query is $\mathcal{O}(n)$ while that of repeated queries is $\mathcal{O}(r)$, where r is the result size of the first query. The amortized cost is $\mathcal{O}(r+d_\omega)$, where $d_\omega$ is the number of updates, after n search repetitions.

As shown with reference to FIG. 7, to implement the search procedure 700 in FS-DSSE, the client computing device 305 is configured for extracting keywords from an input file to be updated 705. The client computing device 305 then creates an unencrypted column in the keyword index file representing the keyword-file relationship for the input file to be updated 710. The client computing device 305 continues by decrypting and incrementing a row counter in the keyword hash table to generate a fresh first cryptographic key, a fresh second cryptographic key and a fresh third cryptographic key 715. The client computing device 305 then uses the fresh first cryptographic key to encrypt the input file to be updated, the fresh second cryptographic key to encrypt the unencrypted column and the fresh third cryptographic key to encrypt the row counter in the keyword hash table 720. The encrypted files, index and keyword hash table are then provided to the server computing device 310 to update the plurality of encrypted input files, the encrypted keyword index and the encrypted keyword hash table 725.

FIG. 8 illustrates steps for updating the files in accordance with FS-DSSE in additional detail. As shown with reference to FIG. 8, given an updated file $f_j$, the client extracts updated keywords and creates the encrypted column I[*,j], which represents the relationship between $f_j$ with all keywords in the encrypted input files. The client then generates m row keys $r_i$ according to the corresponding counters stored in T, at the server. To achieve the forward-privacy, the client must encrypt I[*,j] with all fresh keys, which are unknown to the server. This can be done by generating the row key with the incremented counter, given that the key generated with the current counter has been previously revealed to the server during the previous searches. Finally, the client sends the encrypted column and encrypted files to the server, where the encrypted index and encrypted input files are updated accordingly.

Let $\mathcal{L}$ refer to a leakage function which captures information leakage in FS-DSSE, including the maximum number of keywords and files IDs, the size of each file and access patterns. FSS-DSSE is ($\mathcal{L}$)-IND-CKA secure. The security of a DSSE is defined with the dynamic IND-CK2 notion, which intuitively means that the search and update tokens sent from the client must not reveal any information about the keywords being searched or updated. This notion pertains to leakage function, which captures precisely what information is leaked from the ciphertext and the tokens. Additionally, the forward-privacy implies that the content of updated files should not be linked with any previous search operations. FS-DSSE utilizes an update strategy in which the update operation uses all fresh row keys which are never revealed to the server, which is achieved by increasing the keyword counter maintained in the keyword hash table.

Figure 9:
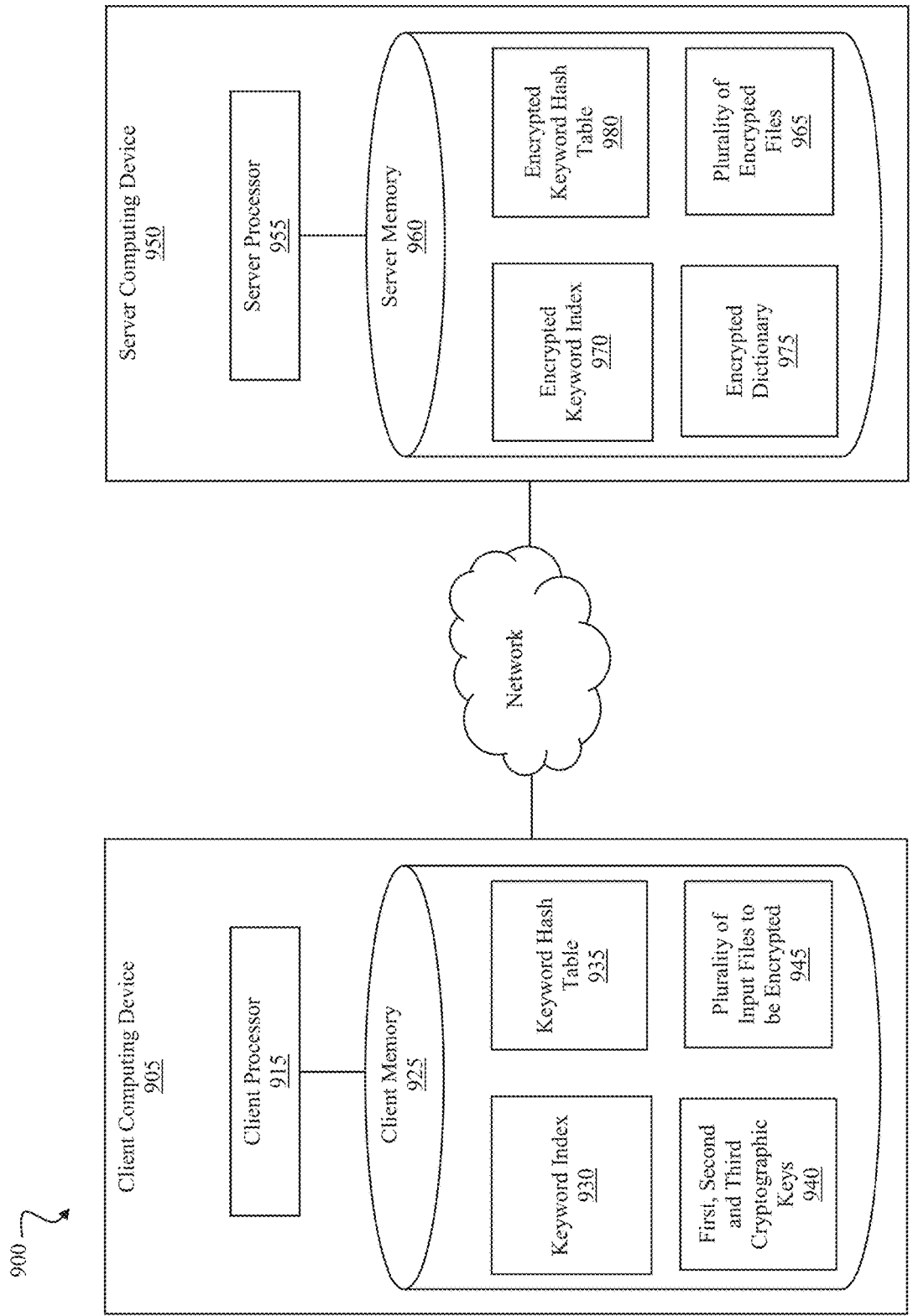
FIG. 9 is a block diagram illustrating a system for implementing FS-DSSE, in accordance with an embodiment of the present invention.

FIG. 9 depicts a client-server system 900 that implements the Forward-Private sublinear Dynamic Symmetric Searchable Encryption (FS-DSSE) process to enable a client computing device 905 to search encrypted files that are stored in a memory of a server computing device 950, in accordance with an embodiment of the present invention. The system 900 includes the client computing device 905, the server computing device 950 and a network 990, such as a local area network (LAN), wide area network (WAN) or other suitable data network that enables communication between the client computing device 905 and the server computing device 950.

The client computing device 905 includes a client processor 915 and a client memory 925. The client computing device 905 may be a portable or desktop computer, smartphone, tablet, wearable device or any other suitable digital computing device. The client processor 915 may be a microprocessor or other digital logic device that executes stored program instructions and the client memory 925 may include both volatile data storage and non-volatile data storage devices.

The client memory 925 of the client computing device 905 stores a keyword index 930, a keyword hash table 935, first, second and third cryptographic keys 940 and a plurality of input files to be encrypted 945. As previously described, the keyword index 930, the keyword hash table 935 and the cryptographic keys 940 are employed in the FS-DSSE scheme to setup, search and update the plurality of encrypted files 965 stored at the server computing device 950.

The server computing device 950 includes a server processor 955 and a server memory 960. The server processor 955 may be a microprocessor or other digital logic device that executes stored program instructions to perform searches and file storage and retrieval services for the client computing device 905. The server memory 960 may include both volatile data storage and non-volatile data storage devices.

The server memory 960 stores an encrypted keyword index 970, an encrypted keyword hash table 980, an encrypted dictionary 975 and a plurality of encrypted files 965. As previously described, the encrypted keyword index 970, the encrypted keyword hash table 980 and the encrypted dictionary 975 are employed in the FS-DSSE scheme to setup, search and update the plurality of encrypted files 965 stored at the server computing device 950.

In an experimental setup to evaluate the performance of the FS-DSSE scheme, FS-DSSE was compared with some state-of-the-art DSEE schemes, including 2D-DSSE, Sophos, and $\Pi_{2lev}^{dyn}$. In this experimental setup, the full Enron email dataset was used, including 517401 files and 1728833 distinct keywords, according to the standard tokenization method, wherein the total number of keyword-file pairs is around 108.

All three schemes were evaluated according to search and update delay. To compare search time, searches were performed from least-common keywords (e.g., only appears in 1, 2 files) to most-common keywords (e.g., appears in 100% files) with 10% intervals. The same strategy was applied to compare the update times. A cost breakdown of the search and update operations for the FS-DSSE scheme is also presented.

Figure 10B:
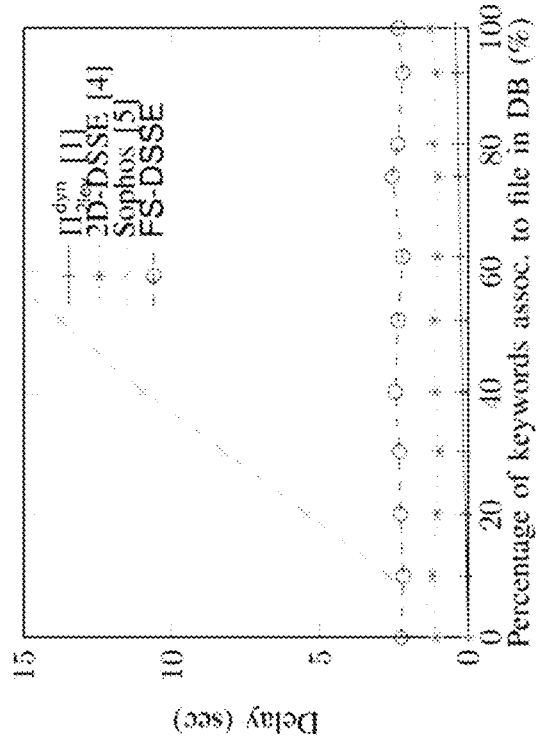
FIG. 10B is a graphical illustration of the percentage of keywords associated to files in the plurality of encrypted input files for various DSSE schemes.
Figure 10A:
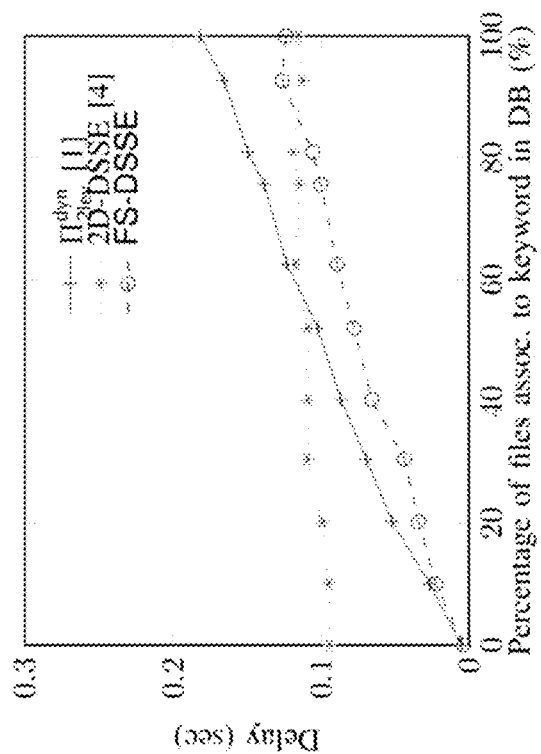
FIG. 10A is a graphical illustration of the percentage of files associated to keywords in the plurality of encrypted input files for various DSSE schemes.

The end-to-end delays for search and update operations of FS-DSSE and its counterparts are presented in FIG. 10A and FIG. 10B, respectively. FIG. 10A illustrates the end-to-end delay for keyword search operations. FIG. 10B illustrates the end-to-end delay for file update operations. As is shown, FS-DSSE achieves the fastest search time among the counterparts in most cases, wherein it is even 1.4 times faster than the most efficient, yet forward-insecure scheme, $\Pi_{2lev}^{dyn}$.

Since search complexity of 2D-DSSE is linear with the maximum number of files in the database, its search time was constant in any size of search query results. Due to the sublinear property of FS-DSSE, it is faster than 2D-DSSE for most of the keywords, where it is up to 35 times faster when searching least-common keywords. 2D-DSSE is only 8 ms faster than FS-DSSE when searching the most common keywords. The search time of Sophos could not fit into this graph due to its heavy public key operations. Specifically, the end-to-end delay was measured to be around 20 seconds, even when searching for least common keywords.

FS-DSSE has a constant update time, similar to 2D-DSSE, for all update files with different numbers of keywords associated with the update files, since they are both linear with the number of keywords in the database. The latency difference between them is that in FS-DSSE, the search term hash table $T_\omega$ at the server instead of at the client, as in 2D-DSSE, to achieve $\mathcal{O}(1)$ client storage, which incur an extra round of communication overhead. On the other hand, the update time of $\Pi_{2lev}^{dyn}$ is the fastest, which is due to the fact that the $\Pi_{2lev}^{dyn}$ scheme has a smaller encrypted index size and therefore, random access is performed on a smaller memory region. Moreover, the random access cost dominates the total update cost in the FS-DSSE scheme of the present invention. The update cost of Sophos increases linearly with the number of keywords associated the update file. The cost is lower than FS-DSSE when the update file is associated with 8.18% of the total number of keywords and it is higher for the remainder. Since the update cost of Sophos is dominated with the public key operations performed at the client side, when the file is associated with 100% keywords, it is 11.39 times slower than FS-DSSE.

Figure 11:
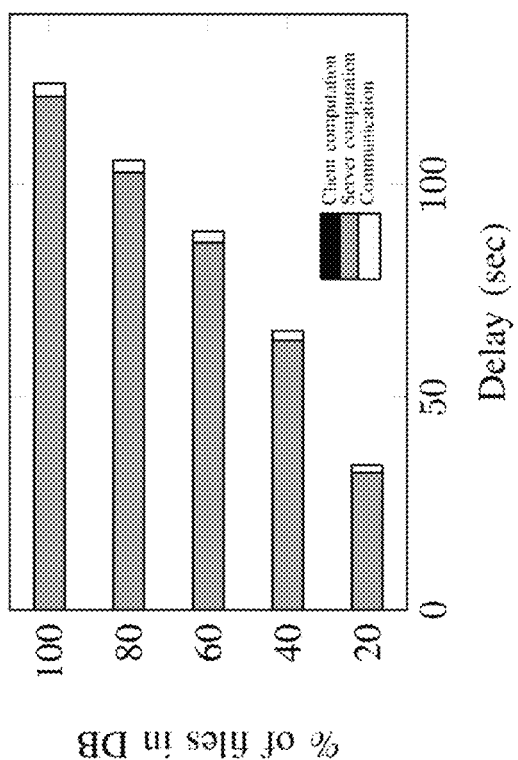
FIG. 11 is a graphical illustration of the cost breakdown of search query in FS-DSSE.

The detailed cost of search operations in FS-DSSE was also studied to observe the factors that have the most impact on the total delay. It is depicted in FIG. 11 that the total delay is mostly dominated by the server computation with the increasing number of files associated with the keyword. Even though the server performs symmetric key encryption/decryption in parallel using 32 cores, it still dominates the total time, since the network speed is extremely fast and the size of the dictionary D, that stores the indexes, greatly increases. Since generating search tokens does not incur any expensive operations, the client computation cost is negligible.

Update cost of the FS-DSSE scheme is constant as the number of keywords associated with the updated file increases, as shown in FIG. 10B. The measurements show that update cost of the FS-DSSE scheme is dominated by the I/O access, due to the non-contiguous memory access. The second major dominating cost of the update operation is the client computation, which requires the re-encryption of the encrypted index column with new keys to achieve forward-privacy. Since the network speed is fast in this exemplary embodiment, the communication cost is lower than other factors.

In various embodiments, the present invention simultaneously provides a novel DSSE scheme that offers forward-privacy, sublinear search complexity and low end-to-end delay. The novel FS-DSSE is achieved by harnessing forward-private update strategies on a 2-dimensional encrypted index, along with a novel caching strategy to reduce the computation time incurred in repeated search queries. The experimental results show that the proposed scheme is high secure and its performed outperformed state-of-the-art forward-private counterparts.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method for searching encrypted files, the method comprising:
   selecting, with a client computing device, a specific keyword to search a plurality of encrypted files stored at a server computing device;
   if the specific keyword has not been previously used to search the plurality of encrypted files;
      using an encrypted keyword index stored at the server computing device to identify one or more encrypted files of the plurality of encrypted files that contain the specific keyword, wherein the encrypted keyword index comprises a plurality of cells, wherein each of the plurality of cells comprises a cell value that represents a keyword-file relationship and a bit state indicating if a most recent operation performed on the cell was a search operation or an update operation;
      storing the keyword-file relationship for each of the one or more encrypted files that contain the specific keyword in an encrypted dictionary at the server computing device;
   if the specific keyword has previously been used to search the plurality of encrypted files;
      using the encrypted dictionary to identify one or more encrypted files of the plurality of encrypted files that contain the specific keyword based upon the keyword-file relationships for the specific keyword previously stored in the encrypted dictionary at the server computing device; and
      using the encrypted keyword index to identify one or more encrypted files that contain the specific keyword that have not been stored in the encrypted dictionary, wherein identifying the additional encrypted files comprises identifying the cells of the encrypted keyword index having a cell value that represents a keyboard-file relationship related to the specific keyword and having a state bit that indicates that the most recent operation performed on the cell was an update operation.

2. The method of claim 1, further comprising:
   transmitting the one or more encrypted files of the plurality of encrypted files that contain the specific keyword to the client computing device; and
   decrypting the one or more encrypted files at the client computing device.

3. The method of claim 1, further comprising:
   generating the plurality of encrypted files and the encrypted keyword index at the client computing device;
   transmitting the plurality of encrypted files and the encrypted keyword index to the server computing device; and
   storing the plurality of encrypted files and the encrypted keyword index at the server computing device.

4. The method of claim 3, wherein generating the plurality of encrypted files and the encrypted keyword index at the client computing device further comprises:
   selecting a plurality of input files to be encrypted;
   extracting a plurality of keywords from the plurality of input files;
   generating a keyword index for the plurality of input files, wherein a row index of the keyword index is assigned to each keyword using a row counter in a keyword hash table;
   encrypting the plurality of input files using a first cryptographic key to provide the plurality of encrypted files;

encrypting the keyword index using a second cryptographic key to generate the encrypted keyword index; and encrypting the keyword hash table using a third cryptographic key.

5. The method of claim 1, wherein selecting a specific keyword to search a plurality of encrypted files stored at the server computing device, further comprises:

requesting an encrypted row counter associated with the specific keyword from an encrypted keyword hash table stored at the server computing device;

receiving the encrypted row counter associated with the specific keyword from the server computing device; and generating a search token comprising a row index of the encrypted keyword index and a row key derived from the encrypted row counter associated with the specific keyword.

6. The method of claim 1, further comprising achieving forward-privacy while updating one or more of the plurality of encrypted files stored at the server computing device.

7. The method of claim 1, further comprising:

generating, by the client computing device, a request for a file of the plurality of encrypted files stored at the server computing device to be updated;

extracting keywords from the input file to be updated at the client computing device;

creating an unencrypted column in the keyword index file representing the keyword-file relationship for the file to the updated;

decrypting and incrementing a row counter in the keyword hash table to generate a fresh first cryptographic key, a fresh second cryptographic key and a fresh third cryptographic key;

encrypting the input file to be updated using the fresh first cryptographic key, encrypting the encrypted column using the fresh second cryptographic key and encrypting the row counter in the keyword hash table using the fresh third cryptographic key; and updating the plurality of encrypted input files, the encrypted keyword index and the encrypted keyword hash table at the server computing device.

8. The method of claim 7, wherein the fresh first cryptographic key, the fresh second cryptographic key and the fresh third cryptographic key are unknown to the server computing device.

9. The method of claim 7, further comprising updating the encrypted dictionary at the server computing device.

10. The method of claim 1, further comprising:

updating the keyword-file relationship in the encrypted dictionary at the server computing device based upon the cells in the encrypted keyword index identified as having a state bit that indicates the most recent operation performed on the cell was an update operation; and changing the state bit of the cells to indicate that the most recent operation performed on the cell was a search operation.

11. A system for searching encrypted files, the system comprising:

a client computing device comprising a client processor and a client memory, the client memory storing a plurality of components and the client processor configured to execute the plurality of components;

a server computing device comprising a server processor and a server memory, the server memory storing a plurality of components and the server processor configured to execute the plurality of components;

a network device configured to send and receive data between the client computing device and the server computing device;

the client processor of the client computing device configured to;

select a specific keyword to search a plurality of encrypted files stored at the server computing device;

if the specific keyword has not been previously used to search the plurality of encrypted files;

use an encrypted keyword index stored at the server computing device to identify one or more encrypted files of the plurality of encrypted files that contain the specific keyword, wherein the encrypted keyword index comprises a plurality of cells, wherein each of the plurality of cells comprises a cell value that represents a keyword-file relationship and a bit state indicating if a most recent operation performed on the cell was a search operation or an update operation;

store the keyword-file relationship for each of the one or more encrypted files that contain the specific keyword in an encrypted dictionary at the server computing device;

if the specific keyword has previously been used to search the plurality of encrypted files;

use the encrypted dictionary to identify one or more encrypted files of the plurality of encrypted files that contain the specific keyword based upon the keyword-file relationships for the specific keyword previously stored in the encrypted dictionary at the server computing device; and use the encrypted keyword index to identify one or more encrypted files that contain the specific keyword that have not been stored in the encrypted dictionary, wherein identifying the additional encrypted files comprises identifying the cells of the encrypted keyword index having a cell value that represents a keyboard-file relationship related to the specific keyword and having a state bit that indicates that the most recent operation performed on the cell was an update operation.

12. The system of claim 11, further comprising:

the server processor of the server computing device further configured to transmit the one or more encrypted files of the plurality of encrypted files that contain the specific keyword to the client computing device using the network device; and the client processor of the client computing device further configured to decrypt the one or more encrypted files.

13. The system of claim 11, further comprising:

the client processor of the client computing device further configured to generate the plurality of encrypted files and the encrypted keyword index and to transmit the plurality of encrypted files and the encrypted keyword index to the server computing device over the network device; and the server memory of the server computing device further configured to store the plurality of encrypted files and the encrypted keyword index.

14. The system of claim 13, the client processor of the client computing device further configured to;

select a plurality of input files to be encrypted, to extract a plurality of keywords from the plurality of input files;

generate a keyword index for the plurality of input files, wherein a row index of the keyword index is assigned to each keyword using a row counter in a keyword hash table; and encrypt the plurality of input files using a first cryptographic key to provide the plurality of encrypted files, to encrypt the keyword index using a second cryptographic key to generate the encrypted keyword index and to encrypt the keyword hash table using a third cryptographic key.

15. The system of claim 11, wherein the client processor of the client computing device is further configured to:

request an encrypted row counter associated with the specific keyword from an encrypted keyword hash table stored at the server computing device;

receive the encrypted row counter associated with the specific keyword from the server computing device over the network device; and generate a search token comprising a row index of the encrypted keyword index and a row key derived from the encrypted row counter associated with the specific keyword thereby selecting the specific keyword to search the plurality of encrypted files stored at the server computing device.

16. The system of claim 11, wherein the client processor of the client computing device is further configured to:

generate a request to the server computing device for a file of the plurality of encrypted files stored at the server computing device to be updated;

extract keywords from the input file to be updated;

create an unencrypted column in the keyword index file representing the keyword-file relationship for the file to the updated;

decrypt and increment a row counter in the keyword hash table to generate a fresh first cryptographic key, a fresh second cryptographic key and a fresh third cryptographic key;

encrypt the input file to be updated using the fresh first cryptographic key, encrypt the encrypted column using the fresh second cryptographic key and encrypt the row counter in the keyword hash table using the fresh third cryptographic key; and provide the plurality of encrypted input files, the encrypted keyword index and the encrypted keyword hash table to the server computing device.

17. The system of claim 16, wherein the fresh first cryptographic key, the fresh second cryptographic key and the fresh third cryptographic key are unknown to the server computing device.

18. The system of claim 16, wherein the client processor of the client computing device is further configured to update the encrypted dictionary at the server computing device.

19. The system of claim 11, further comprising:

updating the keyword-file relationship in the encrypted dictionary at the server computing device based upon the cells in the encrypted keyword index identified as having a state bit that indicates the most recent operation performed on the cell was an update operation; and changing the state bit of the cells to indicate that the most recent operation performed on the cell was a search operation.

20. A nontransitory computer-readable medium comprising instructions that, when executed by a client processor and a server processor, cause the client process and the server processor to perform acts comprising:

selecting, with a client computing device, a specific keyword to search a plurality of encrypted files stored at a server computing device;

if the specific keyword has not been previously used to search the plurality of encrypted files;

using an encrypted keyword index stored at the server computing device to identify one or more encrypted files of the plurality of encrypted files that contain the specific keyword, wherein the encrypted keyword index comprises a plurality of cells, wherein each of the plurality of cells comprises a cell value that represents a keyword-file relationship and a bit state indicating if a most recent operation performed on the cell was a search operation or an update operation;

storing the keyword-file relationship for each of the one or more encrypted files that contain the specific keyword in an encrypted dictionary at the server computing device;

if the specific keyword has previously been used to search the plurality of encrypted files;

using the encrypted dictionary to identify one or more encrypted files of the plurality of encrypted files that contain the specific keyword based upon the keyword-file relationships for the specific keyword previously stored in the encrypted dictionary at the server computing device; and using the encrypted keyword index to identify one or more encrypted files that contain the specific keyword that have not been stored in the encrypted dictionary, wherein identifying the additional encrypted files comprises identifying the cells of the encrypted keyword index having a cell value that represents a keyboard-file relationship related to the specific keyword and having a state bit that indicates that the most recent operation performed on the cell was an update operation.

\* \* \* \* \*